April 7, 1942. J. L. GREEN 2,278,698
POWER TAKE-OFF CONNECTION
Filed May 23, 1940
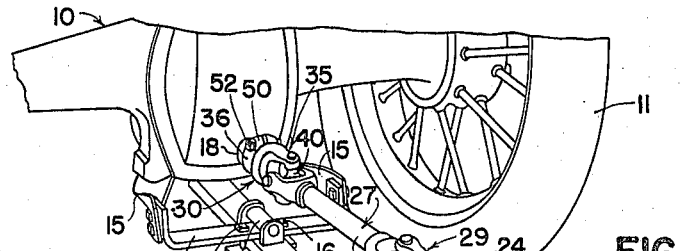
FIG. 1
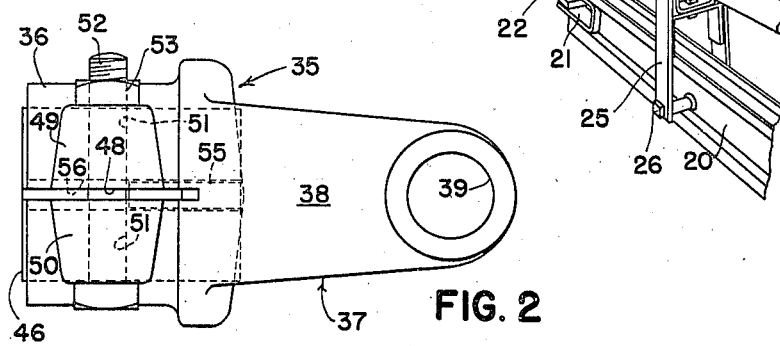
FIG. 2
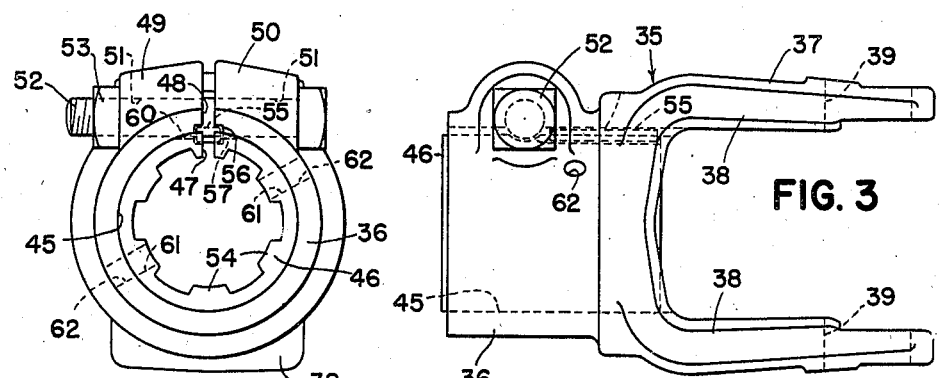
FIG. 3
FIG. 4
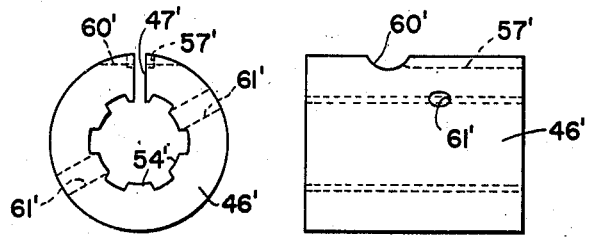
FIG. 5
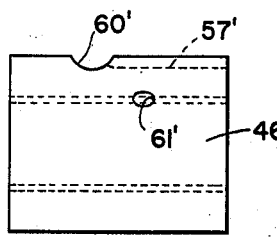
FIG. 6
INVENTOR:
JOSEPH L. GREEN
BY
ATTORNEYS.

Patented Apr. 7, 1942

2,278,698

UNITED STATES PATENT OFFICE 2,278,698

POWER TAKE-OFF CONNECTION

Joseph L. Green, Moline, Ill., assignor to Deere & Company, Moline, Ill., a corporation of Illinois Application May 23, 1940, Serial No. 336,805

2 Claims. (Cl. 287—53)

The present invention relates to power take-off connections and more particularly to power transmitting connections between an implement power shaft and a power take-off on the tractor to which the implement is coupled.

There are numerous implements known to those skilled in the art which are adapted to be drawn behind a tractor and which are equipped with operating mechanism which is driven by power transmitted from the tractor engine through a power take-off shaft connection. Inasmuch as the power take-off shaft on tractors of different makes and sizes are not standardized as to diameter at the present time, it has been necessary for manufacturers of implements of this kind to furnish several sizes of power line connections to fit the various sizes of tractor power take-off shafts, respectively.

The principal object of the present invention, therefore, relates to the provision of a power shaft connection which is interchangeable between tractors having different sizes of power take-off shafts, with a minimum of extra parts required to make the change of connections. In the accomplishment of this object I have provided a power shaft connection including a driving sleeve which is adapted to receive one of a number of adapter bushings, interchangeably, each of which has a different size of splined bore to fit over different sizes of splined tractor power take-off shafts, respectively.

These and other objects and advantages of the present invention will be apparent to those skilled in the art after a consideration of the following description in which reference is had to the drawing appended hereto, in which Figure 1 is a perspective view showing a portion of the rear end of a tractor to which is coupled the front end of an implement draft member and a power shaft connection between the tractor and the power shaft of the implement;

Figure 2 is a plan view showing the forward universal joint member on the power shaft connection, provided with a device embodying the principles of the present invention for connecting the same to the tractor power take-off shaft;

Figure 3 is a side elevation of the connecting member shown in Figure 2;

Figure 4 is an end view of the same;

Figure 5 is an end view of an adapter bushing; and

Figure 6 is a side elevation of the adapter bushing.

Referring now to the drawing, the tractor is represented by a portion of a rear axle housing 10 of the banjo type and supported on a pair of laterally spaced drive wheels 11, one of which is shown in Figure 1. The tractor has a conventional drawbar 12 of the swinging type supported by a roller 13 on a transversely disposed supporting beam 14, which is fixed to the rear axle housing by means of brackets 15 and the drawbar 12 is pivotally connected, by suitable means known to those skilled in the art, at its forward end to the lower side of the tractor body. The drawbar 12 is prevented from swinging laterally upon the support 14 by means of a pair of stop bolts 16 disposed on opposite sides of the drawbar 12, respectively, and engaging a clamping plate 17 extending beneath the drawbar 12. The tractor is provided with the usual power take-off shaft 18 projecting rearwardly from the rear axle housing 10 of the tractor, and which is suitably connected to the tractor engine to receive power therefrom, as is well known in the art.

The implement is represented by a draft tongue 20 which has a clevis 21 at the forward end thereof, pivotally connected by means of a pivot bolt 22 to the rear end of the tractor drawbar 12. The implement receives power from the tractor for driving the operating mechanism of the implement, by means of an implement power shaft 23, supported in a journal bearing 24 which is carried on a bracket 25, the latter being fixed to the forward end of the implement draft tongue 20 by means of a supporting bolt 26.

The implement power shaft 23 is operatively connected to the tractor power take-off shaft 18 by means of a universal joint device, indicated in its entirety by reference numeral 27, and which provides for transmitting power across the pivot connection between the drawbar 12 and the draft tongue 20 to accommodate relative movements of the implement with respect to the tractor. The universal joint device 27 comprises a short section of shafting 28, the rear end of which is coupled by means of a universal joint 29 to the forward end of the implement power shaft 23 and the forward end of which is coupled by means of a universal joint 30 to a connecting device attachable with the power take-off shaft 18 of the tractor, and it is with the last mentioned device that my invention is particularly concerned. This device includes a coupling member 35 which comprises a drive sleeve portion 36 and a universal joint yoke portion 37 preferably cast integrally therewith and the latter comprising a pair of spaced arms 38 having in their ends a pair of aligned bearings 39 adapted to receive the spindles of the universal joint spider member 40.

The sleeve 36 is provided with a smooth cylindrical bore 45 adapted to receive an adapter bushing 46 which has a smooth cylindrical outer surface adapted to slide into the bore 45 of the sleeve 36. The adapter bushing is slotted throughout its length, as at 47, and the drive sleeve 36 is also provided with an axially extending slot 48, and the bushing 46 is normally disposed within the bore 45 with the slot 47 in alignment with the slot 48, as best illustrated in Figure 4. The drive sleeve 36 is provided with a pair of outwardly extending clamping lugs 49, 50, disposed on opposite sides of the slot 48, respectively, and having transversely aligned apertures 51 through which a clamping bolt 52 is inserted and secured by a nut 53. The interior of the adapter bushing 46 is provided with a series of splines 54 which are adapted to interfit with the splines of the tractor power take-off shaft. After the bushing has been slid over the end of the power take-off shaft 18, the clamping bolt 52 and nut 53 are tightened and thereby clamping the drive sleeve 36 and the bushing 46 tightly upon the power take-off shaft. Relative rotation between the bushing 46 and the drive sleeve 36 is prevented by a key 55 which fits into a pair of cooperative keyways 56, 57 in the drive sleeve 36 and adapter bushing 46, respectively. These keyways are recessed into the sides of the slots 48, 47, respectively, that is to say they constitute enlarged portions of the slot. The adapter bushing 46 is also provided with a transverse groove 60 disposed in alignment with the apertures 51 in the lugs 49, 50 to receive the clamping bolt 52.

As additional means for preventing relative rotation between the various members, the bushing 46 and the sleeve 36 are provided with diametrically aligned holes 61, 62, respectively, through which a cotter pin (not shown) can be inserted diametrically through the sleeve, adapter bushing, and tractor power take-off shaft, since most tractor power take-off shafts are provided with such a hole for this purpose.

The adapter bushing shown in Figures 2, 3 and 4 is adapted to receive tractor power take-off shafts of comparatively large diameter, while the adapter bushing shown in Figures 5 and 6 has a smaller interior opening which is adapted to receive splined power take-off shafts of comparatively smaller diameter. In Figures 5 and 6, the primed reference numerals are similar to the reference numerals in Figures 2, 3 and 4, and indicate corresponding parts throughout.

The outer diameters of the adapter bushings 46, 46' are equal, so that both fit the bore 45 of the drive sleeve 36. Obviously, as many adapter bushings as there are sizes of tractor power take-off shafts, may be provided to fit the drive sleeve, and can easily be interchanged to permit the implement to be coupled interchangeably with any tractor.

I claim:

1. A power transmitting connection for connecting the power shaft of an implement with various sizes of splined power take-off shafts on tractors with which said implement may be associated, said connection comprising in combination, a removable adapter bushing having a splined bore for receiving the splined power take-off shaft of one of said tractors, a drive sleeve attached to said implement power shaft and having an internal diameter appreciably greater than the external diameter of the largest power take-off shaft to which said implement shaft is intended to be connected and adapted to embrace the periphery of said bushing, said sleeve and said bushing having aligned radially extending slots and axially extending notches in the opposed inner corners of the slot in the sleeve and in the opposed outer corners of the slot in the bushing, the four notches forming a keyway, a key in said keyway, and means for clamping said sleeve, said bushing and said key rigidly together.

2. A driving connection for connecting a member to a splined shaft, comprising a sleeve on the member having a cylindrical bore of appreciably larger internal diameter than the outer diameter of the shaft, a bushing fitting into the bore of said member and having an internal splined bore adapted to fit over the splines of the shaft, said sleeve and said bushing having aligned radially extending slots and axially extending notches in the opposed inner corners of the slot in the member and in the opposed outer corners of the slot in the bushing, the four notches forming a keyway, a key in said keyway, and means for drawing opposite sides of said member together, to clamp the member, the key and the bushing rigidly together and to the shaft.

JOSEPH L. GREEN.